United States Patent
Clift

(10) Patent No.: US 7,770,172 B2
(45) Date of Patent: Aug. 3, 2010

(54) CONDITIONAL VARIABLES WITHOUT SPINLOCKS

(75) Inventor: Neill Michael Clift, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1167 days.

(21) Appl. No.: 10/932,475

(22) Filed: Sep. 1, 2004

(65) Prior Publication Data

US 2006/0048149 A1 Mar. 2, 2006

(51) Int. Cl.
G06F 9/46 (2006.01)
G06F 15/173 (2006.01)

(52) U.S. Cl. .............. 718/104; 718/100; 709/225; 709/226

(58) Field of Classification Search .......... 718/101, 718/102, 104, 107, 100; 709/225, 226
See application file for complete search history.

(56) References Cited

U.S. PATENT DOCUMENTS

| 4,493,027 | A | * | 1/1985 | Katz et al. ............. 712/228 |
| 6,026,427 | A | * | 2/2000 | Nishihara et al. ......... 718/106 |
| 6,105,050 | A | * | 8/2000 | Govindaraju et al. ...... 718/102 |
| 6,237,019 | B1 | * | 5/2001 | Ault et al. .............. 718/104 |
| 6,272,517 | B1 | * | 8/2001 | Yue et al. .............. 718/102 |
| 6,826,757 | B2 | * | 11/2004 | Steele et al. ............ 719/314 |
| 6,889,269 | B2 | * | 5/2005 | Forin et al. ............. 710/54 |
| 6,910,211 | B1 | * | 6/2005 | Wilhelm, Jr. ............ 718/104 |
| 7,117,481 | B1 | * | 10/2006 | Agesen et al. ........... 717/120 |
| 7,257,814 | B1 | * | 8/2007 | Melvin et al. ........... 718/104 |
| 2002/0120428 | A1 | * | 8/2002 | Christiaens ............. 702/186 |
| 2004/0088573 | A1 | * | 5/2004 | Jeyaram ................ 713/201 |
| 2007/0061619 | A1 | * | 3/2007 | Nemirovsky et al. ....... 714/12 |
| 2007/0294702 | A1 | * | 12/2007 | Melvin et al. ........... 718/104 |

OTHER PUBLICATIONS

"MIT Pthreads", humanfactor.com. Dec. 2003, pp. 1-8.*

* cited by examiner

Primary Examiner—Meng-Ai An
Assistant Examiner—Caroline Arcos
(74) Attorney, Agent, or Firm—Lee & Hayes, PLLC

(57) ABSTRACT

The use of spinlocks is avoided in the combination of mutex and condition variables by using any suitable atomic compare and swap functionality to add a thread to a list of waiting threads that waits for a data event to occur. Various embodiments of the present invention also provide an organization scheme of data, which describes an access bit, an awaken count, and a pointer to the list of waiting threads. This organization scheme of data helps to optimize the list of waiting threads so as to better awaken a waiting thread or all waiting threads at once.

20 Claims, 12 Drawing Sheets

CONDITIONAL VARIABLES WITHOUT SPINLOCKS

FIELD OF THE INVENTION

The present invention relates generally to synchronization, and more particularly, to synchronization constructs called condition variables.

BACKGROUND OF THE INVENTION

Early operating systems allowed users to run only one program at a time. Users ran a program, waited for it to finish, and then ran another one. Modern operating systems allow users to execute (run) more than one program at a time or even multiple copies of the same program at the same time. This change highlights a subtle distinction: the difference between a program and a process. A program is a static sequence of instructions whereas a process is the dynamic invocation of a program along with the system resources required for the program to run. Thus, a process, in the simplest terms, is an executing program.

Processes include one or more threads. A thread is the basic unit used by the operating system to allocate processor time. A thread can include any part of the process code, including parts currently being executed by another thread. A processor is capable of executing only one thread at a time. However, a multitasking operating system, i.e., an operating system that allows users to run multiple programs, appears to execute multiple programs at the same time. In reality, a multitasking operating system continually alternates among programs, executing a thread from one program, then a thread from another program, etc. As each thread finishes its subtask, the processor is given another thread to execute. The extraordinary speed of the processor provides the illusion that all of the threads execute at the same time. Multitasking increases the amount of work a system accomplishes because most programs do not require that threads continuously execute. For example, periodically, a thread stops executing and waits while a slow resource completes a data transfer or while another thread is using a resource it needs. When one thread must wait, multitasking allows another thread to execute, thus taking advantage of processor cycles that would otherwise be wasted. The use of spinlocks removes this advantage as discussed further hereinbelow.

Threads often require a way to communicate with one another to coordinate their activities. While there are many complex forms of communication among threads, the simplest form is a synchronization construct, which includes events, semaphores, timers, and mutexes. Synchronization refers to the ability of one thread to voluntarily stop executing and wait until another thread performs some operation. On a multiprocessor system, both threads can run simultaneously, each on its own processor. This situation may cause each thread to simultaneously compete for access to the same resource, thereby creating the possibility of a race condition. A race condition exists when a thread modifies a resource to an invalid state, and then another thread attempts to access that resource and use it in the invalid state. One way to coordinate these two threads is through a combination of synchronization constructs: a mutex and a condition variable. FIG. 1 illustrates this and other problems in greater detail.

A system 100 includes a customer 102, which is an individual communicating with a program 110 to purchase desired goods or services. The program 110 has one thread 104 of execution for creating sales orders based on the requests of the customer 102 and another thread 108 that takes sales orders to process them and ship goods to the customer 102. Access to a sales queue 106 is protected by a critical section to avoid the existence of a race condition. Race conditions can be prevented by identifying critical sections and enforcing mutual exclusion among threads. Critical sections are areas, such as the sales queue 106, where multiple threads 104, 108 can be executing simultaneously and these threads 104, 108 are making changes to shared data. Mutual exclusion is achieved when only one thread at a time is permitted to execute within the critical section.

Consider a situation where the thread 108 enters the critical section to take sales orders from the sales queue 106 and finds the sales queue 106 empty. There is nothing for the thread 108 to do until the thread 104 adds new sales orders to the sales queue 106. The thread 108 would preferably wait for the thread 104 to arrive with new sales orders. In order for the thread 104 to add new sales orders to the sales queue 106, the thread 104 must be able to enter the critical section presently occupied by the thread 108. Therefore, the thread 108 must unlock the mutex associated with the sales queue 106. To be apprised that the sales queue 106 is not empty, the thread 108 also must put itself on a waiting list and block itself from further execution. Both the unlocking of the mutex and the blocking of execution must occur atomically. If not, the thread 104 may enter the critical section (the sales queue 106) and leave without notifying the thread 108 that the sales queue 106 is non-empty.

The use of condition variables avoids such a problem. Waiting on a condition variable allows the acts of blocking the thread and unlocking the mutex to happen in one atomic operation. Conventional implementation of the waiting feature of a condition variable uses a spinlock to lock the condition variable before the acts of unlocking the mutex and blocking the thread can be executed. The main disadvantage of a spinlock is that the thread must loop continuously in the code until it can lock the condition variable. This is problematic for a multiprogramming system because a single microprocessor is shared among many processes and threads. The continuous loop of the spinlock robs precious microprocessor cycles that other processes and threads could otherwise use for completing their tasks.

When a system has only a few shared resources, the inefficiency caused by a few spinlocks may not be noticeable. But when a system requires numerous shared resources, the proliferation of spinlocks will detrimentally affect the performance of the system. Without a better synchronization construct to guard against race conditions while allowing better performance, users may no longer trust the system 100 to provide a desired computing environment. As a result, usage of the system 100 will diminish in the marketplace. Thus, there is a need for a system, method, and computer-readable medium for causing a thread to wait or for signaling a thread to execute while avoiding or reducing the foregoing and other problems associated with existing system.

SUMMARY OF THE INVENTION

In accordance with this invention, a system, method, and computer-readable medium for causing a thread to wait for a data event to occur and for causing a thread to be awakened in response to the data event to perform work. The system form of the invention includes, in a computer system, multiple pieces of software being executed concurrently, which comprises a shared resource on the computer system which is protected by a mutex to regulate access to the shared resource; multiple threads of execution that are capable of concurrently accessing the shared resource to read or write data; and a condition variable that causes threads wanting to access the shared resource to wait until a data event has occurred without having to use a spinlock to lock the condition variable.

In accordance with further aspects of this invention, the computer-readable medium form of the invention includes a computer-readable medium having a data structure stored thereon for use by a computing system to manage a linked list of waiting threads, which comprises a pointer that points to the linked list of waiting threads; an awaken count that is indicative of a count of waiting threads to be awakened; and an access bit that is indicative of whether the linked list of waiting threads is being accessed by a thread to awaken another thread in response to an occurrence of a data event connected with a condition variable synchronization construct.

In accordance with further aspects of this invention, a method form of the invention includes a method implemented in a computer, which comprises invoking a signal function to awaken a waiting thread; and invoking a wait function by a thread to cause the thread to wait until a data event has occurred that is connected with a condition variable. The wait function atomically unlocks a mutex associated with the condition variable and causes the thread to wait without the use of a spinlock to lock the condition variable.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Two synchronization constructs, a mutex and a condition variable, can be used in combination to protect a critical section while allowing multiple threads to wait until a data event has occurred to perform further work. Conventional conditional variables use spinlocks to avoid internal race conditions while conditional variables cause threads to wait and atomically release mutexes. Various embodiments of the present invention avoid the need to use spinlocks by using any suitable atomic compare and swap functionality to add a thread to a list of waiting threads. Various embodiments of the present invention also provide an organization scheme of data, which describes an access bit, an awaken count, and a pointer to the list of waiting threads. This organization scheme of data helps to optimize the list of waiting threads so as to better awaken a waiting thread or all waiting threads at once.

Figure 1:
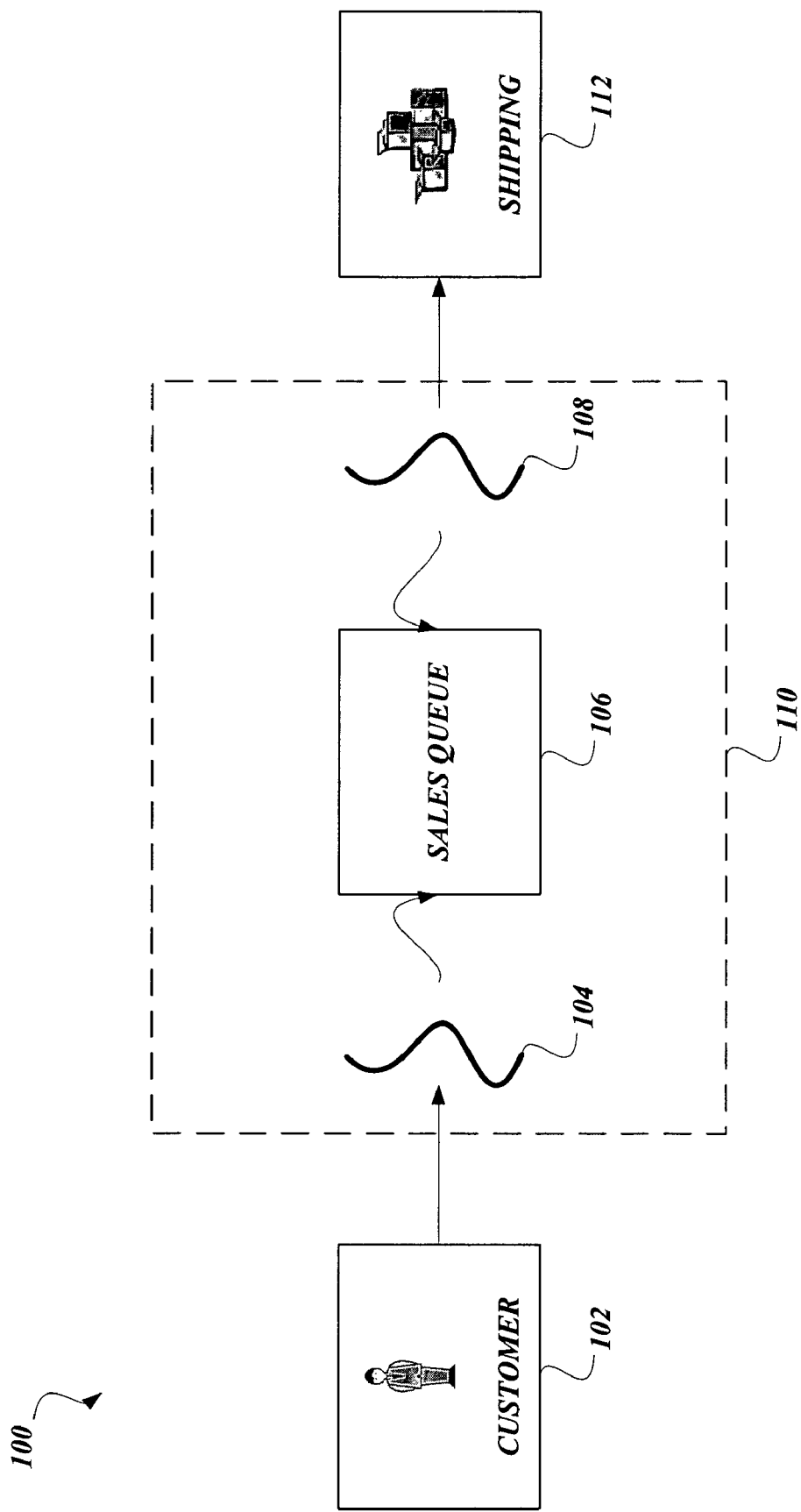
FIG. 1 is a block diagram illustrating an exemplary synchronization problem that is obviated by the use of condition variables.
Figure 2:
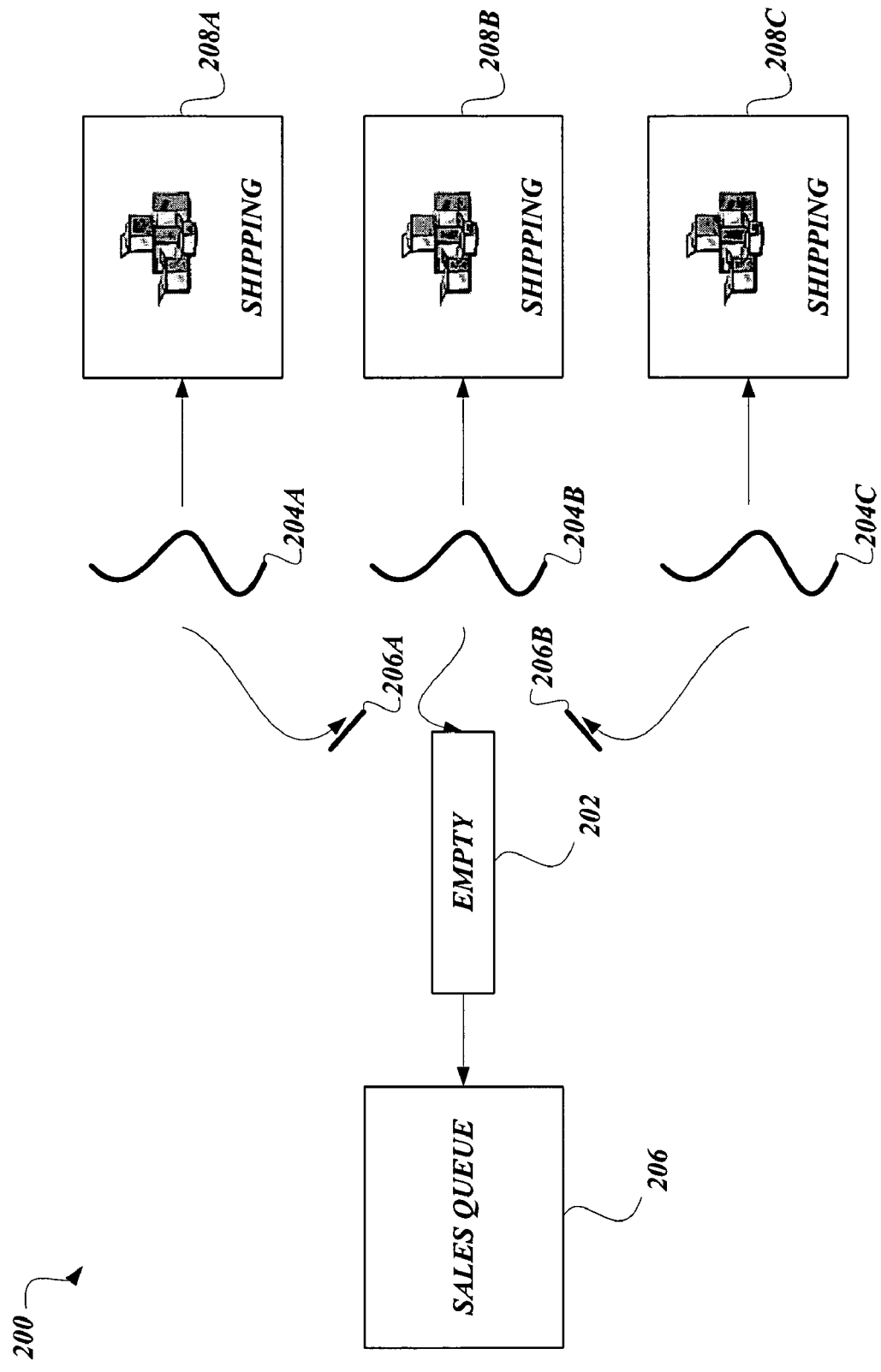
FIG. 2 is a block diagram illustrating the use of a condition variable for providing a mechanism to signal or wait for a specific data event in a critical section protected by a mutex in accordance with one embodiment of the present invention.

A system 200 includes a sales queue 206, which is a multi-element data structure from which elements can be removed in the same order in which they were inserted; that is, it follows a first in, first out (FIFO) constraint. See FIG. 2. Each element of the sales queue 206 is an order, which is a commission to purchase, sell, or supply goods or to perform work as specified by the order. As will be appreciated by one skilled in the art, the use of the sales queue 206, among other examples, is to illustrate the enhanced synchronization construct called a condition variable by various embodiments of the present invention. The condition variables of various embodiments of the present invention can be suitably used in any situation that requires synchronization for specific events associated with data in a critical section being protected by a mutex or mutual exclusion synchronization construct.

An EMPTY condition variable 202 is used to communicate among threads 204A-204C about the state of shared data, such as whether the sales queue 206 is empty or non-empty. If the sales queue 206 is empty, there is no order to be processed. On the other hand, if the sales queue 206 is not empty, there are orders to be processed. Threads 204A-204C are independent paths of software execution within one or more processes. Sharing of resources, such as the sales queue 206, with multiple threads 204A-204C can create data corruption. In designing a computer system with concurrent threads of execution, it is preferable to avoid any potential data access conflicts caused by multiple threads reading or writing the data at the same time. This conflict can be advantageously avoided by using a synchronization construct, such as a mutex (not shown) and the EMPTY condition variable 202. Associated with the thread 204A is a piece of software 208A for shipping goods connected with an order in the sales queue 206; a piece of software 208B that is associated with the thread 204B and ships goods based on orders picked up by the thread 204B; and orders that are accessible by the thread 204C that are shipped by a piece of software 208C.

Threads 204A-204C execute concurrently and asynchronously in the system 200, hence each thread can independently access the EMPTY condition variable 202 to determine whether an order exists in the sales queue 206. Because actions of threads 204A-204C need to be performed without conflicts, threads 204A-204C use the EMPTY condition variable 202 to avoid race conditions and wait until the resources, such as the sales queue 206, become available. Race conditions are avoided by identifying critical sections, such as the sales queue 206, and enforcing the mutual exclusion of thread execution in these sections. In other words, critical sections are code areas where multiple threads 204A-204C can be executing simultaneously and these threads are making changes to shared data contained in the sales queue 206. Mutual exclusion is achieved when one thread among threads 204A-204C is allowed to be active in the critical section at a time. To achieve this, a critical section is typically surrounded by entry and exit guards. The entry guard acts as a barrier and blocks all but one thread at a time from entering and the exit guard acts to release the entry barrier.

The purpose of the empty condition variable 202 is to provide a synchronization construct to signal and wait for specific events related to data in the sales queue 206. In the illustrative instance, the thread 204B has obtained access to the sales queue 206 to check for an order in the sales queue 206 because it has been signaled that the state of the EMPTY condition variable 202 is false (meaning that the sales queue 206 is non-empty). Threads 204A, 204C are blocked (illustrated by short horizontal bars 206A, 206B) from further execution. The threads 204A, 204C wait until the EMPTY condition variable 202 indicates that the sales queue 206 is non-empty for one of them to access an order in the sales queue 206.

Figure 3B:
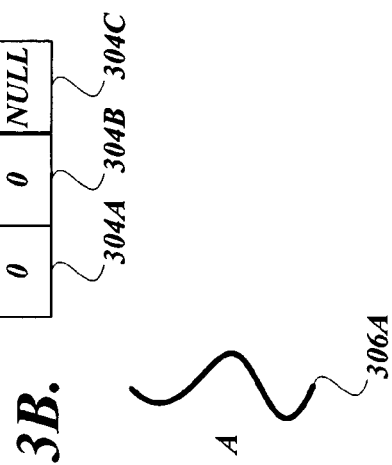
FIG. 3B is a pictorial diagram illustrating a thread waiting in a linked list of waiting threads until a data event has occurred, in accordance with one embodiment of the present invention.
Figure 3C:
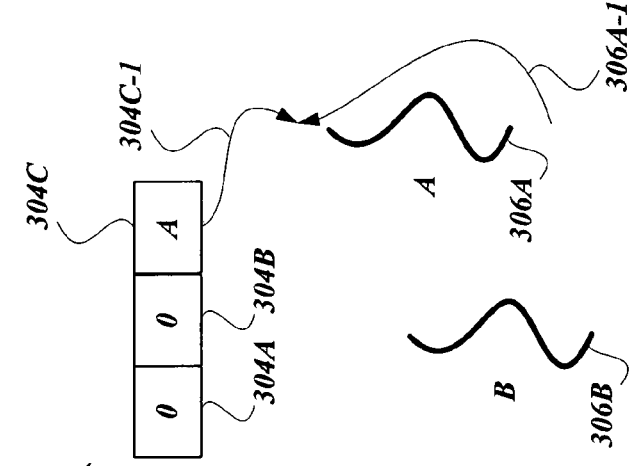
FIG. 3C is a pictorial diagram illustrating another thread waiting in a linked list of waiting threads for a data event to occur, in accordance with one embodiment of the present invention.
Figure 3A:
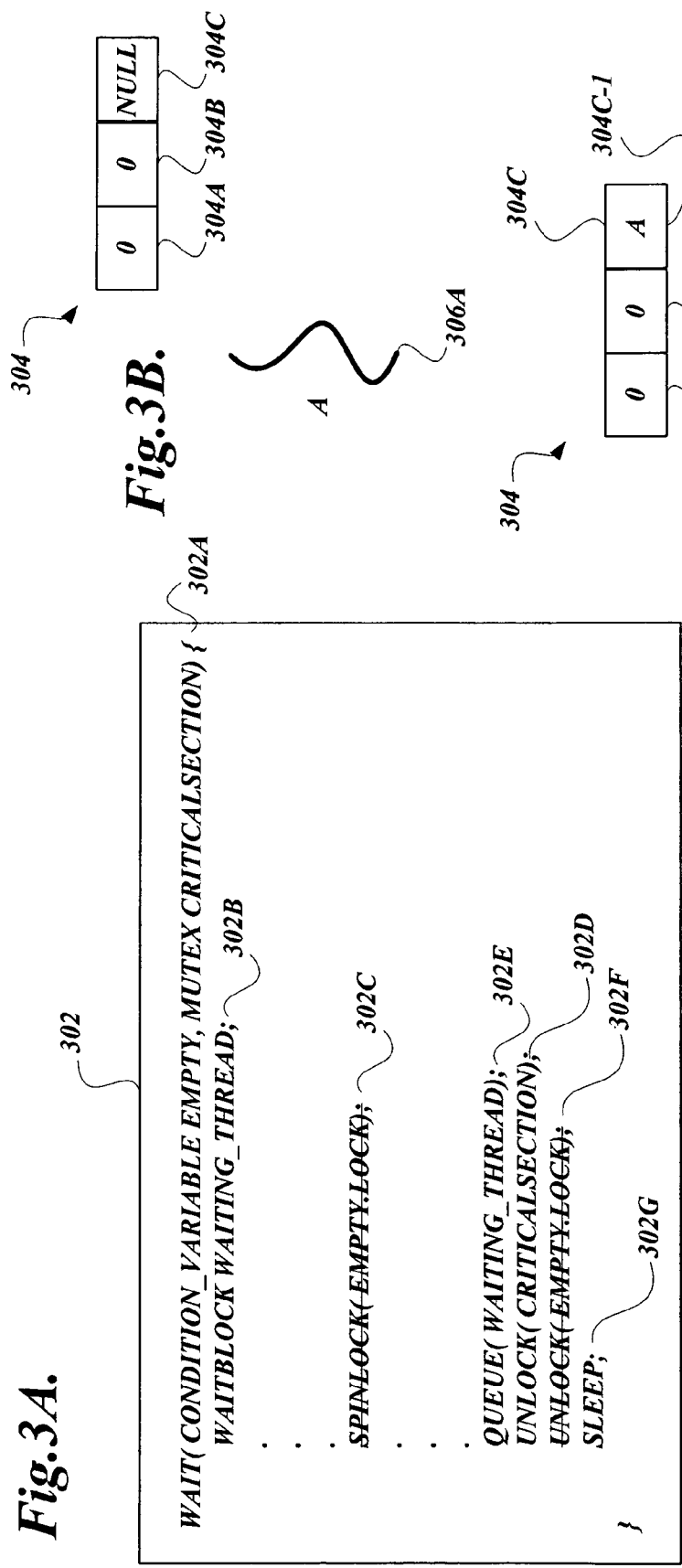
FIG. 3A is a piece of source code illustrating a wait function associated with a condition variable without the use of a spinlock, in accordance with one embodiment of the present invention.

FIG. 3A illustrates a piece of code that describes a wait function 302 connected with a condition variable, such as the EMPTY condition variable 202. Waiting on a condition variable, such as the EMPTY condition variable 202, ensures that the blocking of the thread (which invokes the wait function) and the unlocking of the mutex associated with the condition variable happens in one atomic operation. An atomic operation is considered or guaranteed to be indivisible. Either the operation is uninterruptible or, if it is aborted, a mechanism is provided that ensures the return of the system to a state prior to the initiation of the operation.

Line 302A expresses the signature of the wait function, which provides "WAIT(CONDITION_VARIABLE EMPTY, MUTEX CRITICALSECTION) {}", where the term "WAIT" indicates the name of the wait function; the pair of parentheses "( )" encloses parameters that are passed into or passed out of the wait function; the term "CONDITION_VARIABLE" indicates a data type, which is a definition of a set of data that specifies the possible range of values of the set, the operations that can be performed on the values, and the way in which the values are stored in memory; the term "EMPTY" indicates an instantiation of the type CONDITION_VARIABLE; the comma "," delimits one parameter from another parameter in the function signature described on line 302A; the term "MUTEX" indicates a data type associated with a mutual exclusion synchronization construct and defines a set of data that specifies the possible range of values of the set, the operations that can be performed on the values, and the way in which the values are stored in memory; the term "CRITICALSECTION" indicates an instantiation of the data type mutex; and a pair of curly brackets "{}" delimits a collection of program statements that define the wait function 302.

Line 302B describes a declaration of an instantiation of a data type WAITBLOCK called WAITING_THREAD. Such a declaration is a binding of the identifier WAITING_THREAD to the information that relates to it, which in this instance is the data type WAITBLOCK. A thread that is to be blocked or is to wait until a data event has occurred is expressed as a data structure defined by the data structure WAITBLOCK. Such a data structure will be used to form an element of a linked list of waiting threads and remain stationary in readiness for the occurrence of the data event (such as whether the EMPTY conditional variable 202 is TRUE or FALSE indicating that the sales queue 206 is no longer empty).

Before a thread is placed into a linked list of waiting threads, conventionally, a lock is obtained on the condition variable to avoid a race condition internally within the wait function 302. Line 302C describes a conventional approach to lock the EMPTY condition variable 202. Line 302C describes a strikethrough statement "SPINLOCK (EMPTY.LOCK);", where the term "spinlock" indicates that the wait function 302 loops continuously or spins while waiting to lock the EMPTY condition variable 202; the pair of parentheses "( )" delimits a parameter that will be passed into the function "SPINLOCK"; the term "EMPTY.LOCK" indicates a lock field of the condition variable EMPTY; and the semicolon ";" delimits the end of the statement described by line 302C. Spinlocks are undesirable because continual looping in a multiprogramming environment, where a single microprocessor is shared among many processors and threads, needlessly uses precious microprocessor cycles that other processes or threads may be able to use more productively. Various embodiments of the present invention avoid the need to use spinlocks, hence improving software performance.

Line 302D describes "UNLOCK (CRITICALSECTION);", where the term "UNLOCK" indicates the invocation of the unlock function to release a critical section for other threads to execute; a pair of parentheses "( )" delimits the parameters that will be passed into the invocation of the UNLOCK function; the term "CRITICALSECTION" indicates the critical section protected by a mutex that is to be unlocked; and the semicolon ";" delimits the end of the statement on line 302D. As indicated above, shared resources or shared data, such as the sales queue 206, must be protected by a mutex in a critical section in order to ensure that no order is accidentally missed. In order for an external thread to insert a new order into the sales queue 206, one of the threads 204A-204C must unlock the mutex associated with the critical section containing the shared resources or shared data, such as the sales queue 206. Line 302D allows the act of unlocking of the mutex to be performed atomically together with the act of inserting a thread into the linked list of waiting threads.

Line 302E describes a statement "QUEUE (WAITING_THREAD);" where the term "QUEUE" indicates an invocation of a queue function; a pair of parentheses "( )" delimits the parameters that are passed into the invocation of the QUEUE function; the term "WAITING_THREAD" denotes the data structure representing a thread to be inserted into the linked list of waiting threads; and the semicolon ";" delimits the end of the statement on line 302E. The functionality of the queue function is discussed in greater detail hereinbelow with reference to FIGS. 3B-3F.

Line 302F describes a strikethrough statement "UNLOCK( EMPTY.LOCK);", where the term "unlock" denotes an invocation of the unlock function to release a lock associated with the EMPTY condition variable 202; a pair of parentheses "( )" delimits the parameters that are passed into the invocation of the UNLOCK function; the term "EMPTY.LOCK" denotes the EMPTY condition variable 202, which was declared on line 302A; and the semicolon delimits the end of the programming statement 302F. The statement on line 302F is not needed in various embodiments of the present invention because there is no need to lock the empty condition variable 202 as previously discussed on line 302C. By avoiding the need to lock the empty condition variable 202, better performance can be obtained. Line 302G describes a SLEEP programming statement, which in a multiprocessing environment denotes a temporary state of suspension of a thread during which the thread remains in memory so that some event, such as an interrupt or signal from another thread or process, can awaken it.

FIG. 3B illustrates an organizational scheme 304 of data that includes an access bit 304A, an awaken count 304B, and a pointer 304C to a linked list of waiting threads. FIG. 3B illustrates a scenario where a thread A 306A wishes to wait for a data event to occur that is associated with the EMPTY condition variable 202, while the linked list of waiting threads is empty. A zero ("0") value at the access bit 304A indicates that there is no thread which currently wishes to access the linked list of waiting thread. A zero ("0") value associated with the awaken count 304B indicates that there is no accumulation of threads wanting to awaken one or more waiting threads. The NULL value associated with the pointer 304C indicates that the linked list of waiting threads is empty.

FIG. 3C illustrates a scenario where the thread A 306A has been inserted as the first thread in the linked list of waiting threads. The pointer 304C points. (visually illustrated by the arrow 304C-1) to the thread A 306A. A last pointer 306A-1 points to the thread A 306A because there are no other waiting threads in the linked list of waiting threads. The last pointer 306A-1 is provided by various embodiments of the present invention to allow the oldest waiting thread to be located in a linked list of waiting threads so as to enhance execution performance. A thread B 306B also waits to be inserted into the linked list of waiting threads.

Figure 3D:
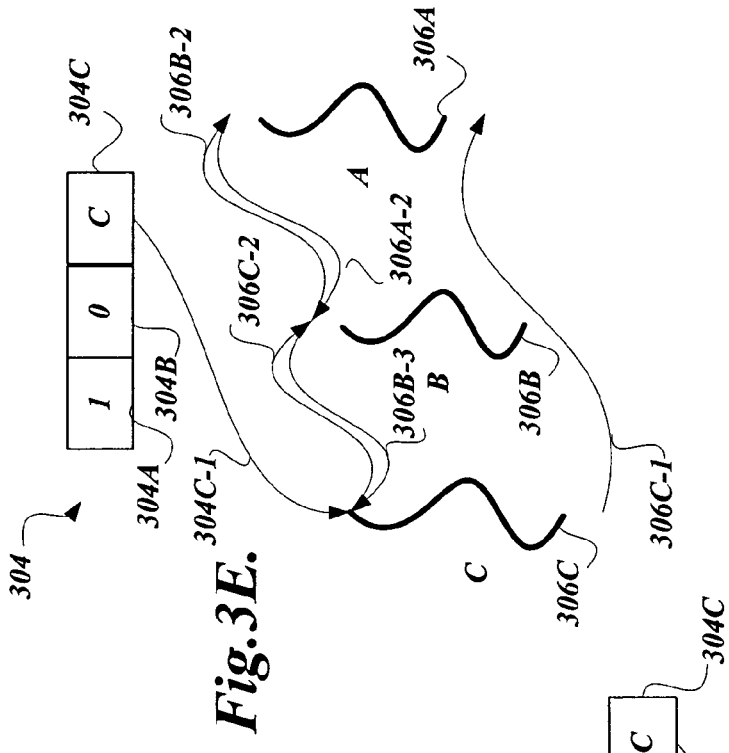
FIG. 3D is a pictorial diagram illustrating the insertion of additional threads onto a linked list of waiting threads and an optimization method for associating the newest thread with the oldest thread, in accordance with one embodiment of the present invention.

FIG. 3D illustrates the insertion of the thread B 306B into the linked list of waiting threads and the desire of another thread C 306C to be inserted into the linked list of waiting threads. The value of the access bit 304A has been set to one ("1"), indicating that the thread C 306C is accessing the linked list of waiting threads. The awaken count 304B remains zero ("0"), indicating that no thread has signaled the empty condition variable 202 to awaken a waiting thread. The linked list pointer 304C is now set to point to a newly inserted thread B 306B (visually presented by the arrow 304C-1). A last pointer of the thread B 306B points (visually represented by the arrow 306B-1) to the oldest waiting thread, which is the thread A 306A. A previous pointer of the thread A 306A points (visually represented by the arrow 306A-2) to the thread B 306B and a next pointer of the thread B 306 B points (visually represented by the arrow 306B-2) to the thread A 306A.

Figure 3E:
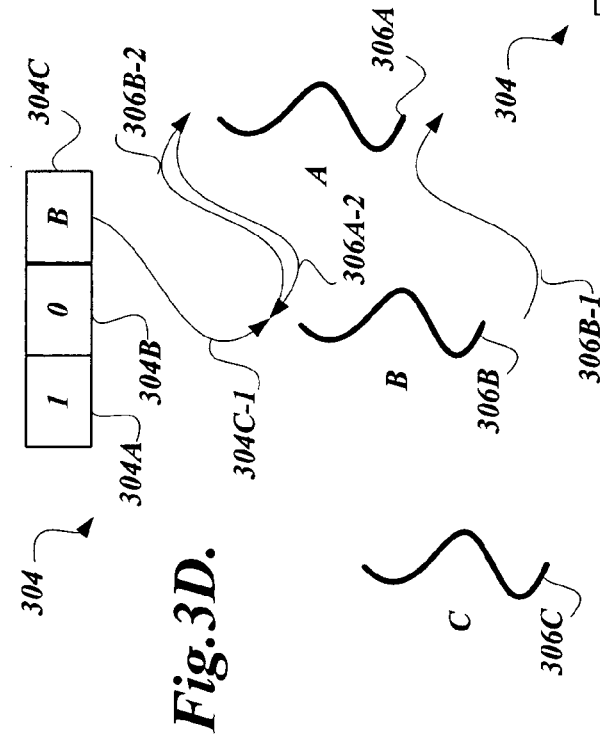
FIG. 3E is a pictorial diagram illustrating waiting threads in a linked list wherein an optimization method is performed to associate the newest waiting thread with the oldest waiting thread, in accordance with one embodiment of the present invention.

FIG. 3E illustrates a scenario where the thread C 306C has been inserted into the linked list of waiting threads. The access bit 304A has a value of one ("1"), indicating that the thread C 306C is being inserted onto the linked list of waiting threads or the thread C 306C is optimizing the linked list of waiting threads. The awaken count 304B remains zero ("0"), indicating that no thread has signaled the linked list of waiting threads to awaken the oldest waiting thread. The pointer 304C now points to the thread C 306C as the head of the linked list of waiting threads. (Such association is symbolically illustrated as an arrow 304C-1.) A last pointer 306C-1 of the thread C 306C points to the thread A 306A, facilitating quick retrieval of the oldest waiting thread, which is the thread A 306A. The previous pointer of the thread A 306A points (visually illustrated by the arrow 306A-2) to the thread B 306B. The next pointer of the thread pointer B 306B points (visually illustrated by the arrow 306B-2) to the thread A 306A. A previous pointer of the thread B 306B points (visually illustrated by the arrow 306B-3) to the thread C 306C. A next pointer of the thread C 306C points (visually illustrated by the arrow 306C-2) to the thread B 306B.

Figure 3F:
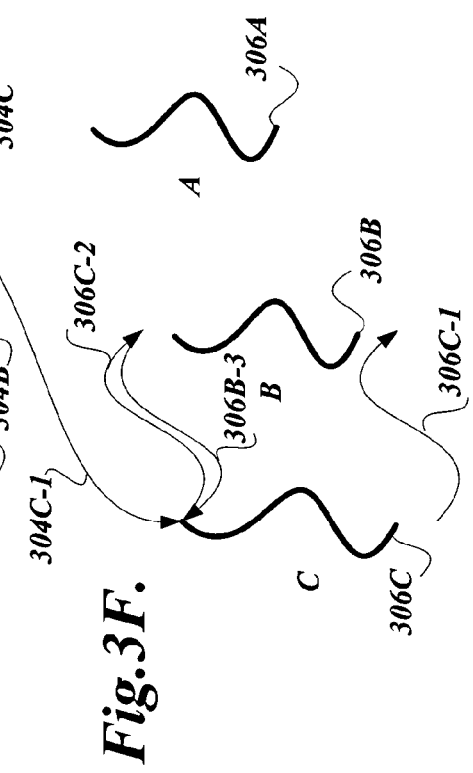
FIG. 3F is a pictorial diagram illustrating the awakening of the oldest thread in a linked list of waiting threads and an optimization method to associate the head of the linked list with the oldest thread, in accordance with one embodiment of the present invention.
Figure 4A:
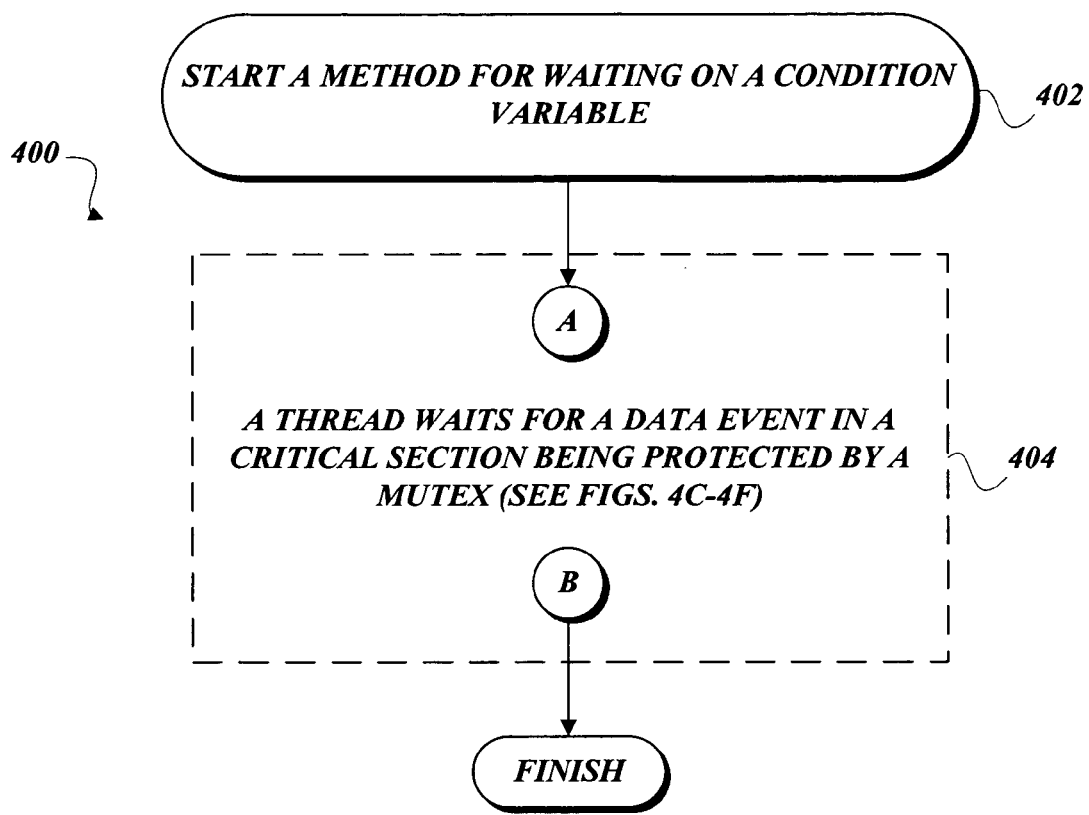
FIGS. 4A-4I are process diagrams illustrating a method for waiting on a condition variable and another method for signaling a condition variable, in accordance with one embodiment of the present invention.
Figure 4B:
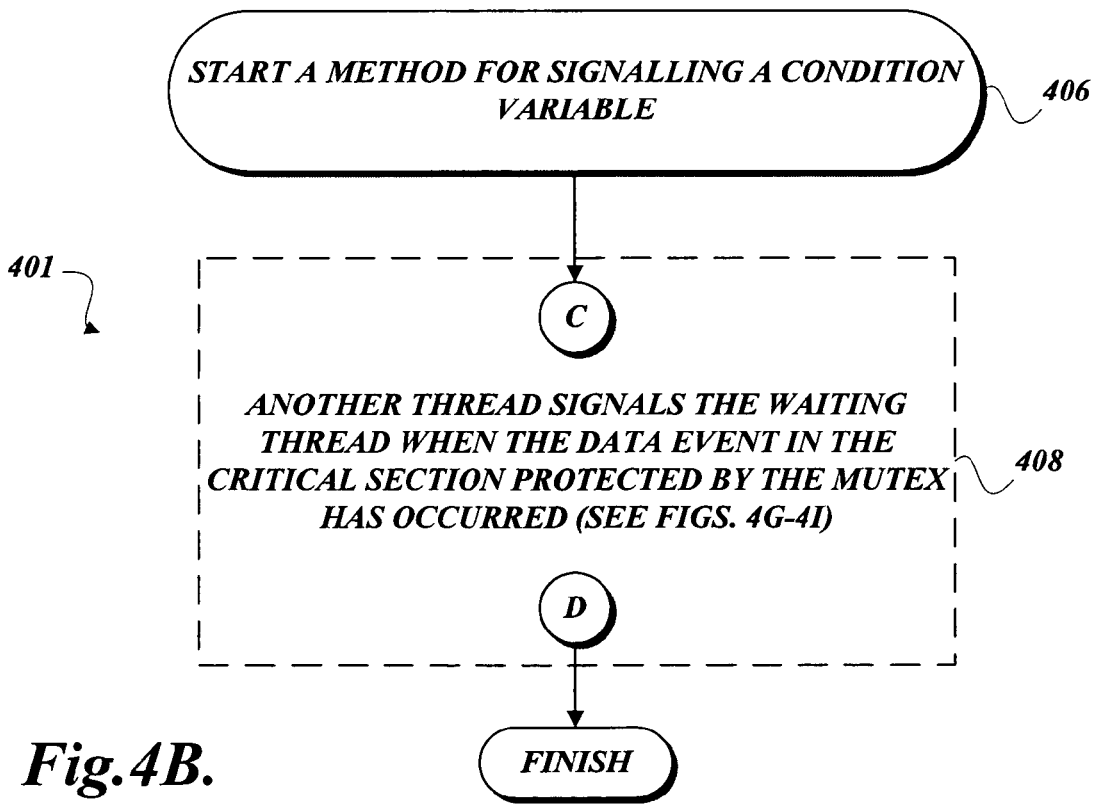
Figure 4C:
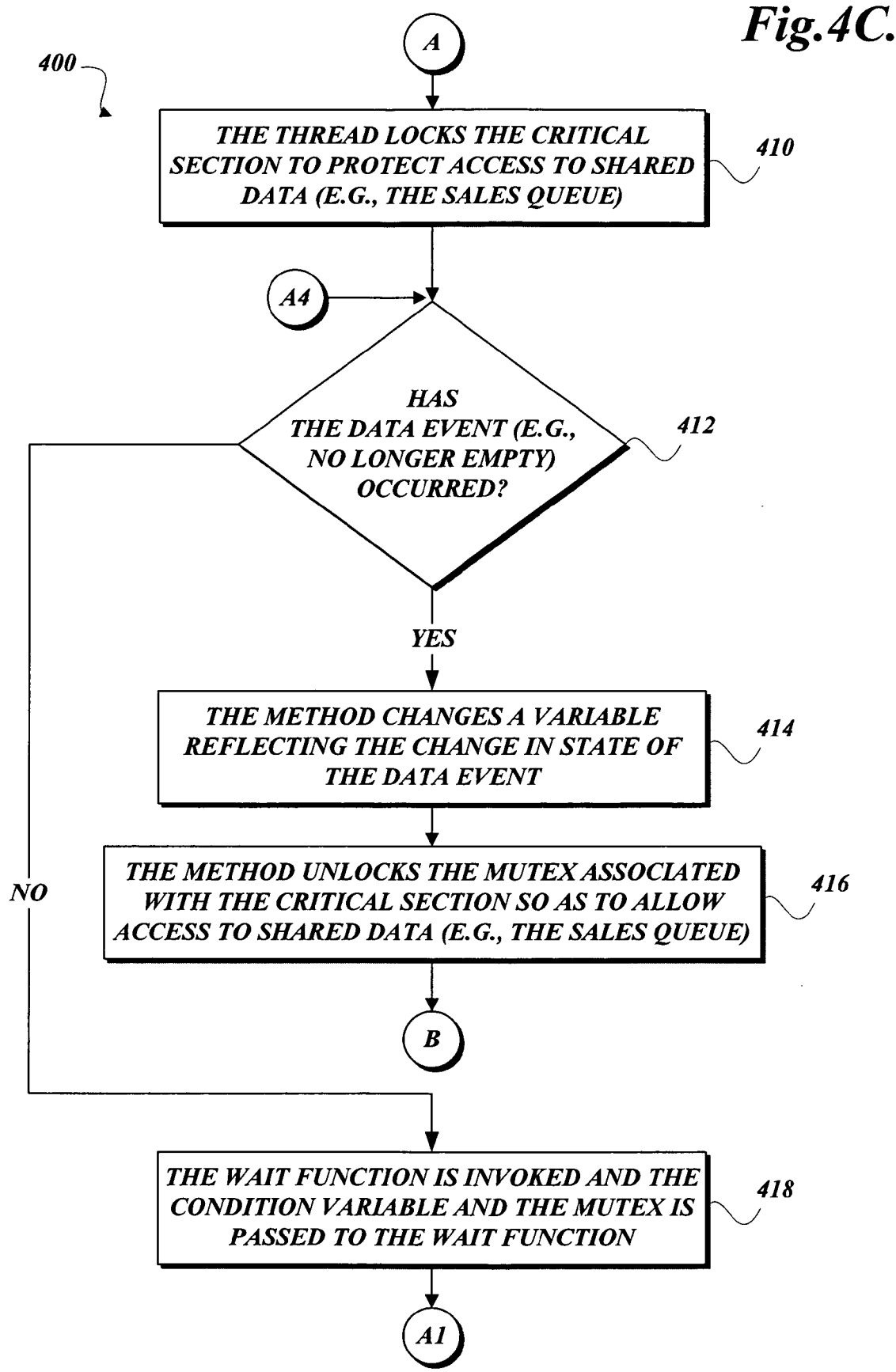
Figure 4D:
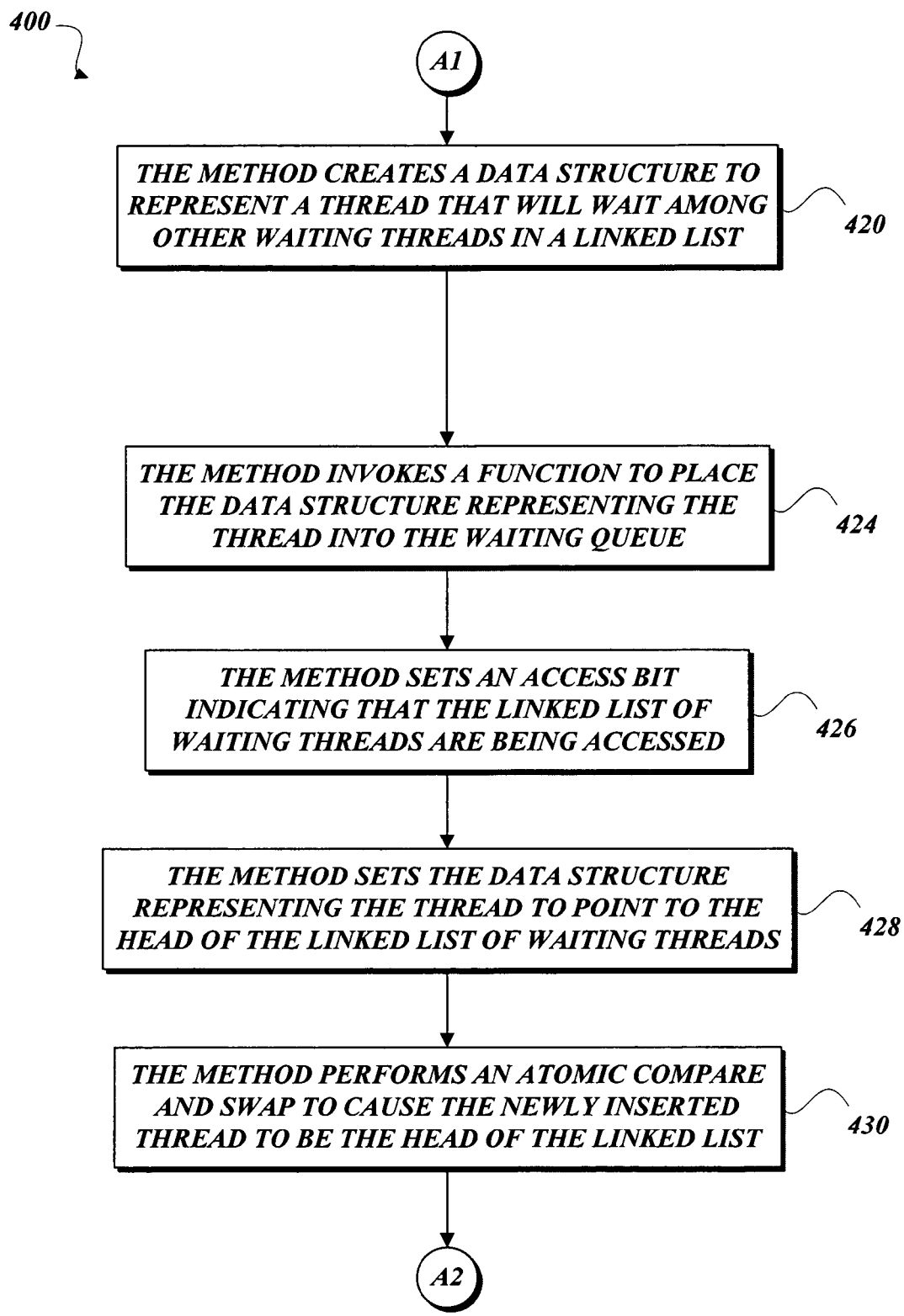
Figure 4E:
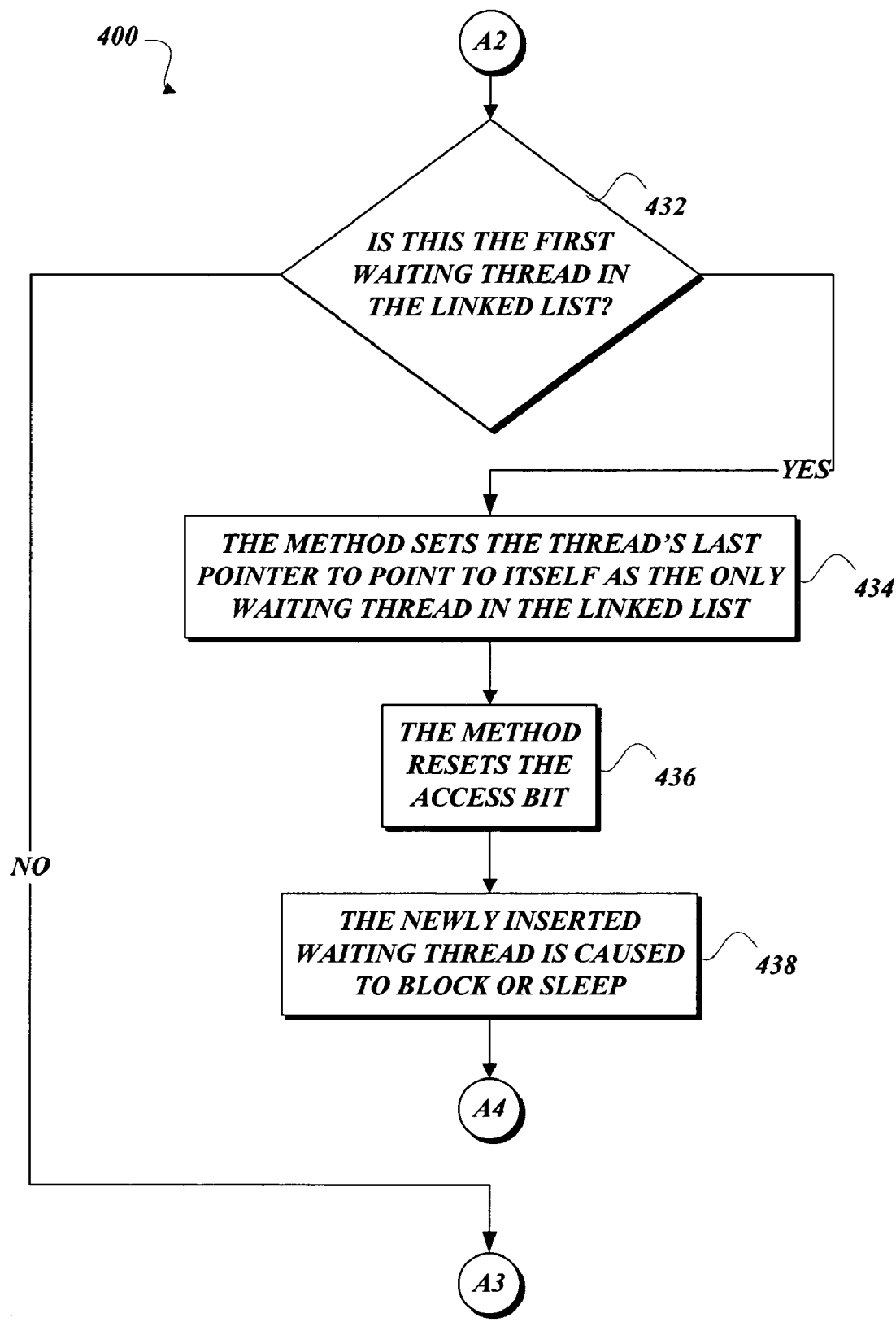
Figure 4F:
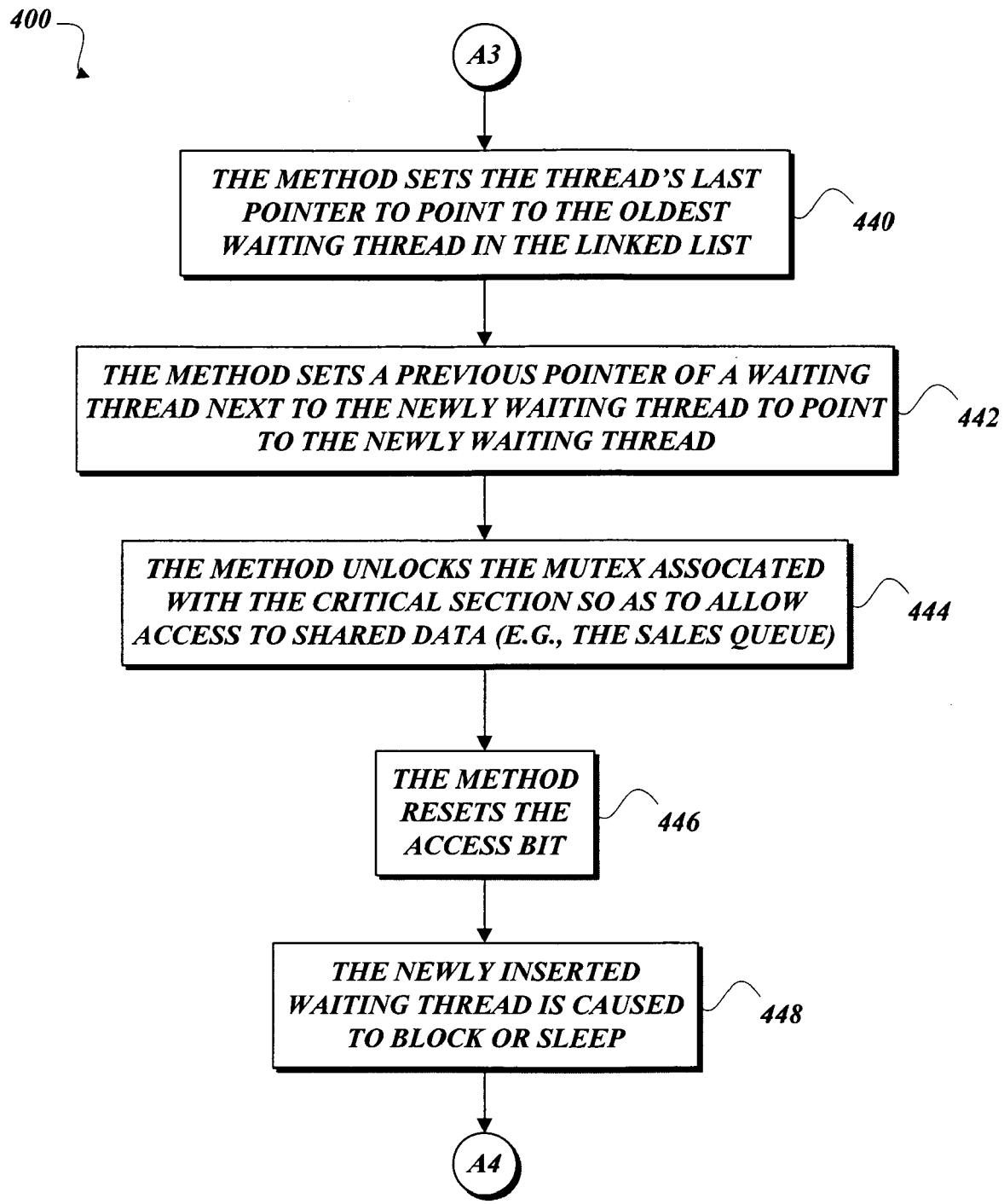
Figure 4G:
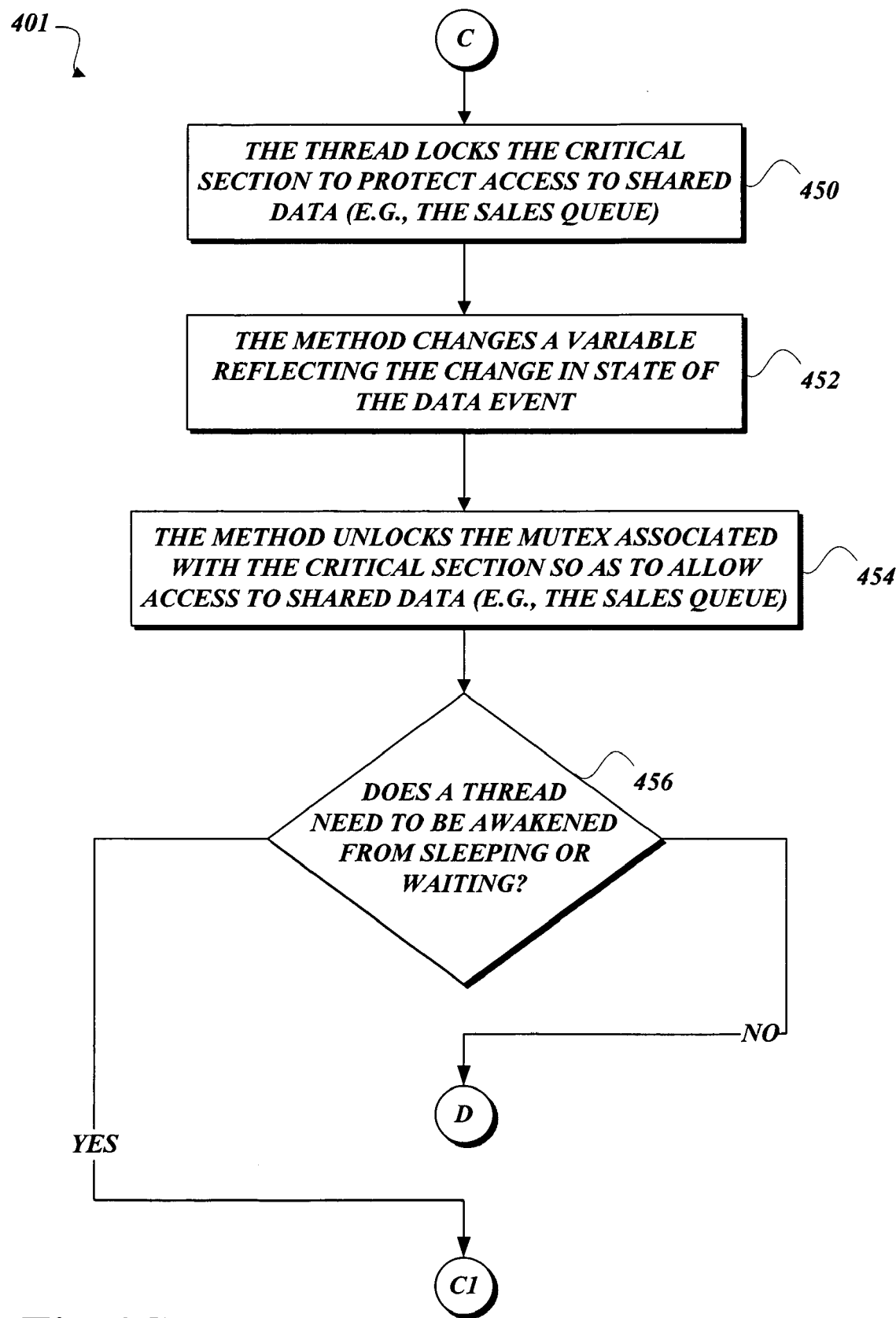
Figure 4H:
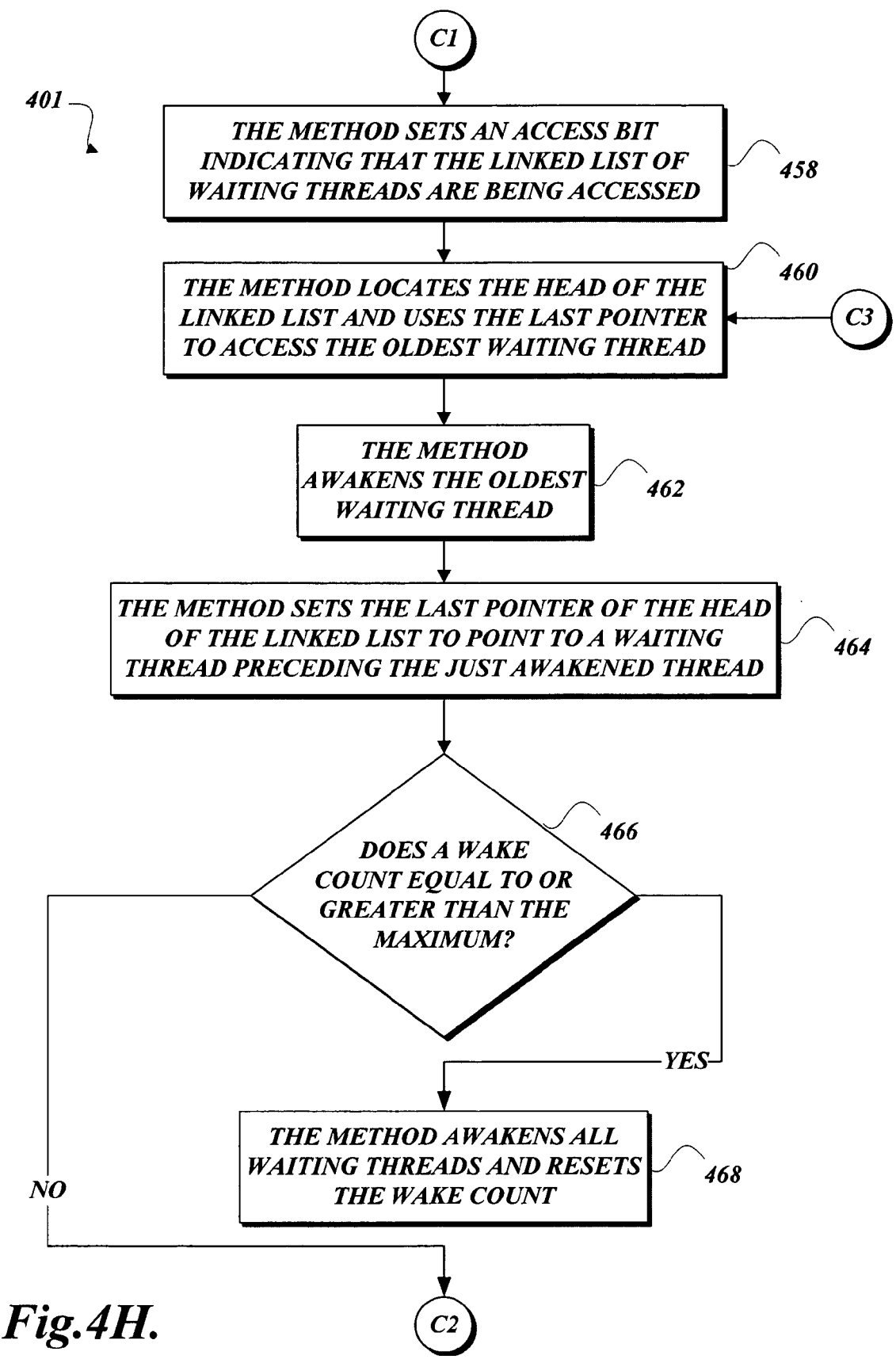
Figure 4I:
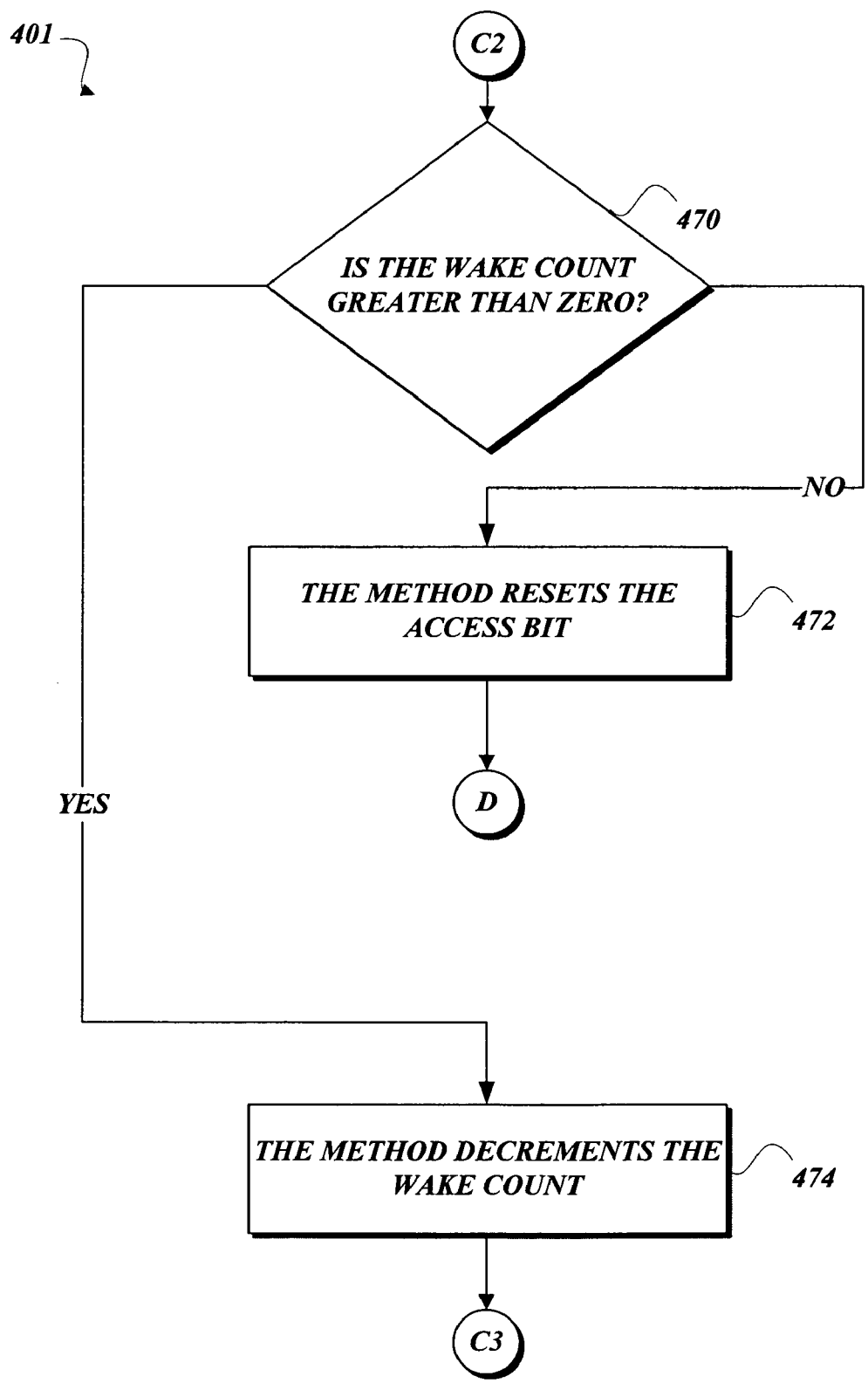

FIG. 3F illustrates the awakening of the thread A 306A from the linked list of waiting threads. The access bit 304A of the organizational scheme of data 304 is set to one ("1") indicating that a thread has access to the linked list of waiting threads to awaken the oldest waiting thread, which in this instance is the thread A 306A. The awaken count 304B is set to one ("1"), indicating that another thread has signaled the empty condition variable 2020 to cause yet another waiting thread to be awakened (which will be the thread B 306B). The pointer 304C points (visually illustrated by the arrow 304C-1) to the thread C 306C, which is the head of the linked list of waiting threads. Because the thread A 306A has been awakened, it can access the sales queue 206 to obtain an order for processing. Various embodiments of the present invention allow the thread that has awakened, the thread A 306A, to further optimize the link list. For example, the last pointer of the thread C 306C now points (visually illustrated by the arrow 306C-1) to the thread B 306B instead of pointing to the thread A 306A, which has been awakened.

FIGS. 4A-4I illustrate methods 400, 401 for causing threads to wait until a data event represented by a condition variable has occurred or for causing a signal to be sent to a waiting thread and awaken the waiting thread. For clarity purposes, the following description of methods 400, 401 makes references to various elements illustrated in connection with the system 200, such as the sales queue 206; the EMPTY condition variable 202 (FIG. 2); various programming statements 302A, 302B, 302D, 302E, and 302G (FIG. 3A); and the organizational scheme of data 304, which includes the access bit 304A, the awaken count 304B, and the pointer 304C which points to the link list of waiting threads (FIGS. 3B-3F). From a start block 402, the method 400 proceeds to a set of method steps 404, defined between a continuation terminal ("terminal A") and an exit terminal ("terminal B"). The set of method steps 404 describes that a thread waits for a data event in a critical section being protected by a mutex.

From terminal A (FIG. 4C), the method 400 proceeds to block 410 where the thread locks the critical section to protect access to shared data (for example, the sales queue 206). The process 400 then proceeds to decision block 412 where a test is performed to determine whether the data event has occurred (e.g., that the sales queue 206 is no longer empty). If the answer to the test at decision block 412 is YES, the method 400 changes a variable reflecting the change in the state of the data event. See block 414. At block 416, the method 400 unlocks the mutex associated with the critical section so as to allow access to the shared resources or shared data (e.g., the sales queue 206). The method 400 then continues to terminal B where it terminates execution. If the answer to the test at decision block 412 is NO, the wait function 302 is invoked and the condition variable and the mutex are passed to the wait function. (See line 302A of FIG. 3A.) The method 400 then continues to another continuation terminal ("terminal A1").

From terminal A1 (FIG. 4D), the method 400 proceeds to block 420 where the method creates a data structure to represent a thread that will wait among other waiting threads in a linked list. (See statement 302B of FIG. 3A.) The method 400 invokes a function to place the data structure representing the thread into the waiting queue. See block 424. (See also statement 302E of FIG. 3A.) The method sets an access bit (element 304A of FIGS. 3B-3F) indicating that the linked list of waiting threads are being accessed. See block 426. At block 428, the method 400 sets the data structure representing the thread to point to the head of the linked list of waiting threads (see pointer 304C of FIG. 3C). The method 400 performs an atomic compare and swap to cause the newly inserted thread to be the head of the linked list. See block 430. This atomic compare and swap facility allows various embodiments of the present invention to obviate the need for looping to obtain a lock on the condition variable, such as the EMPTY condition variable 202. This enhances execution performance because no spinlock must be obtained. Any suitable atomic compare and swap facility can be used, such as ones provided by a microprocessor instruction set. The method 400 then continues at another continuation terminal ("terminal A2").

From terminal A2 (FIG. 4E), the method 400 proceeds to decision block 432 where a test is made to determine whether this is the first waiting thread in the linked list. If the answer is YES to the test at decision block 432, the method 400 sets the thread's last pointer to point to itself as the only waiting thread in the linked list. See block 434. (See also FIG. 3C, where the thread A 306A points to itself). The method resets the access bit 304A. See block 436. At block 438, the newly inserted waiting thread is caused to be blocked or sleeping. (See statement 302G of FIG. 3A.) The method 400 then continues to another continuation terminal ("terminal A4") and loops back to the test 412 at FIG. 4C, where the above-described processing steps are repeated. If the answer to the test at decision block 432 is NO, the method 400 continues to another continuation terminal ("terminal A3").

From terminal A3 ("FIG. 4F"), the method 400 sets the thread's last pointer to point to the oldest waiting thread in the linked list. (See FIG. 3D where the thread B 306B points to the thread A 306A.) At block 442, the method sets a previous pointer 306A-2 of a waiting thread 306A next to the newly waiting thread 306B to point to the newly waiting thread 306B. Next, at block 444, the method unlocks the mutex associated with the critical section so as to allow access to shared data (e.g., the sales queue 206). (See statement 302D of FIG. 3A.) The method then resets the access bit 304A. See block 446. At block 448, the newly inserted waiting thread is caused to be blocked or sleeping. (See statement 302G of FIG. 3A.) The method 400 then continues to terminal A4 and loops back to decision block 412 where the above-described processing steps are repeated.

Returning to FIG. 4B, from a start block 406, the method 401 proceeds to a set of method steps 408, defined between a continuation terminal ("terminal C") and an exit terminal ("terminal D"). The set of method steps 408 describes that the another thread signals the waiting thread when the data event in the critical section protected by the mutex has occurred. From terminal C (FIG. 4G), the method 401 proceeds to block 450 where the thread locks the critical section to protect access to shared data (e.g., the sales queue 206). The method 401 changes a variable reflecting the change in state of the data event. See block 452. At block 454, the method 401 unlocks the mutex associated with the critical section so as to allow access to shared data (e.g., the sales queue 206). The method 401 then proceeds to decision block 456 where a test is performed to determine whether a thread must be awakened from sleeping or waiting. If the answer is NO, the method 401 proceeds to terminal D and terminates execution. If the answer to the test at decision block 456 is YES, the method 401 continues to another continuation terminal ("terminal C1").

From terminal C1 (FIG. 4H), the method 401 sets an access bit 304A indicating that the linked list of waiting threads are being accessed. See block 458. At block 460, the method 401 locates the head of the linked list and uses the last pointer to access the oldest waiting thread (see arrow 306C-1 where the last pointer of the thread C 306C points to the oldest waiting thread A 306A). At block 462, the method awakens the oldest waiting thread 306A. The method 401 proceeds to block 464 where the method sets the last pointer of the head of the linked list to point to a waiting thread preceding the just-awakened thread (e.g., see the arrow 306C-1 where the thread C 306C points now to the thread B 306B, instead of the thread A 306A).

The method 401 then proceeds to decision block 466 where a test is made to determine whether the awaken count 304B is equal to or greater than the maximum allowed. If the answer to the test at decision block 466 is YES, the method 401 awakens all waiting threads and resets the awaken count. See block 468. Otherwise, the answer to the test at decision block 466 is NO and the method 401 proceeds to another continuation terminal ("terminal C2").

From terminal C2 (FIG. 4I), the method 401 proceeds to another decision block 470 where a test is made to determine whether the awaken count is greater than 0. If the answer is NO, the method 401 proceeds to block 472 to reset the access bit 304A. The method 401 then proceeds to the exit terminal D and terminates execution. Otherwise, the answer to the test at decision block 470 is YES, and the method 401 decrements the awaken count. See block 474. The method 401 then proceeds to another continuation terminal ("terminal C3") where it loops back to block 460 and repeats the above-described processing steps.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer system comprising:
a processor;
a memory electronically coupled to the processor;
a shared resource on the computer system protected by a mutex to regulate access to the shared resource (the mutex of the shared resource);
multiple threads of execution that are each capable of concurrently and asynchronously accessing the shared resource to read or write data, wherein each of the multiple threads of execution are queued in a linked list of waiting threads to access the shared resource;
a lock-free condition variable that causes each of the multiple threads of execution to wait until an event associated with the lock-free condition variable has occurred, the causing of each thread to wait occurring without locking the lock-free condition variable;
an access bit that controls access to waiting threads;
an awaken count that is a tally of a number of waiting threads; and
a pointer to the linked list of waiting threads, wherein the pointer points to a head of the linked list of waiting threads, wherein the pointer is swapped within a wait function to point to a newly inserted thread in the linked list of waiting threads, and wherein the mutex of the shared resource is released such that the shared resource is freed for access by another thread within the wait function by freeing the mutex of the shared resource before any other thread is allowed to access the shared resource, the pointer being swapped and the mutex of the shared resource being released and freed in a single indivisible set of operations of the wait function.

2. The computer system of claim 1, wherein the shared resource includes a software resource or hardware resource.

3. The computer system of claim 1, wherein the multiple threads of execution are threads of one process.

4. The computer system of claim 1, wherein the multiple threads of execution are threads of multiple processes.

5. A computer-readable storage medium having a data structure and instructions stored thereon for use by a computing system, when executed by a computer, cause the computer to manage a linked list of waiting threads, the data structure comprising:
a pointer that points to a head of the linked list of waiting threads, wherein a waiting thread is a thread in a wait state;
an awaken count that is indicative of a count of waiting threads; and an access bit that is indicative of whether the linked list of waiting threads is being accessed by a currently processing thread to awaken another thread in response to an occurrence of a data event connected with a lock-free condition variable;

wherein the instructions direct the computing system to perform operations comprising:

acquiring and locking, by the currently processing thread, a mutex associated with a shared resource;

checking a state of the shared resource;

swapping a waiting thread, in the linked list in a single indivisible operation without the use of any lock associated with the data structure, to point the waiting thread to a newly inserted thread in the linked list of waiting threads; and releasing the shared resource by unlocking the mutex associated with the shared resource.

6. The computer-readable storage medium of claim 5, wherein the awaken count has a maximum value, wherein when the awaken count is greater than the maximum value of all waiting threads in the linked list of waiting threads, all waiting threads are awakened.

7. The computer-readable storage medium of claim 5, wherein a thread at the head of the linked list of waiting threads points to an oldest waiting thread in the linked list of waiting thread so as to awaken the oldest thread, and wherein the shared resource is released before any other thread is allowed to access the lock-free condition variable associated with the shared resource.

8. The computer-readable storage medium of claim 5, wherein the access bit is not set to insert a thread into a linked list of waiting threads when the thread is the only member of the linked list of waiting threads.

9. The computer-readable storage medium of claim 5, wherein the acts further comprise, after releasing the shared resource, sleeping the newly inserted thread.

10. The computer-readable storage medium of claim 5, wherein the acts are performed within an uninterruptible wait function.

11. A method implemented in a computer, the method comprising:

pointing at a particular thread at a head of a linked list of waiting threads, wherein a waiting thread is a thread in a wait state;

invoking, a signal function to awaken the particular thread; and invoking, a wait function to cause the particular thread to wait until an event has occurred that is connected with a lock-free condition variable, the wait function, in a single indivisible operation, performing acts comprising:

acquiring and locking a mutex associated with a shared resource and associated with the lock-free condition variable, the mutex providing mutual exclusion to the shared resource;

checking a state of the shared resource;

unlocking the mutex associated with the shared resource; and causing the particular thread to wait for access to the shared resource associated with the lock-free condition variable without locking the condition variable, wherein the shared resource is concurrently and asynchronously accessible by more than one thread to read or write data.

12. The method of claim 11 wherein arguments to the wait function comprise a lock-free condition variable and a mutex.

13. The method of claim 11, further setting an access bit to indicate that the linked list of waiting threads is being accessed to awaken a thread or to optimize the linked list of waiting threads.

14. The method of claim 11, further incrementing an awaken count to indicate that one or more waiting threads are to be awakened, all waiting threads in the linked list of waiting threads being awakened when the awaken count reaches a maximum allowed value.

15. The method of claim 11, wherein the particular thread at the head of the linked list of waiting threads is an oldest waiting thread of the linked list of waiting threads.

16. A computer-readable storage medium having executable instructions stored thereon that, when executed by a computer, cause the computer to perform operations comprising:

pointing at a head of a linked list of waiting threads, wherein a waiting thread is a thread in a wait state;

invoking a signal function to awaken the waiting thread; and invoking a wait function by a thread to cause the thread to wait until an event has occurred that is connected with a lock-free condition variable, the wait function, in a single indivisible operation, performing acts comprising:

acquiring and locking a mutex associated with a shared resource and associated with the lock-free condition variable, the mutex providing mutual exclusion to the shared resource;

checking a state of the shared resource;

unlocking the mutex associated with the lock-free condition variable; and causing the thread to wait for access to the shared resource associated with the lock-free condition variable without locking the condition variable, wherein the shared resource is concurrently and asynchronously accessible by more than one thread to read or write data.

17. The computer-readable storage medium of claim 16, wherein arguments to the wait function comprise the lock-free condition variable and the mutex and wherein the thread is inserted at the head of a linked list of waiting threads through the use of an atomic compare and swap operation which obviates the need for any looping to obtain a lock on the lock-free condition variable.

18. The computer-readable storage medium of claim 16, further comprising setting an access bit to indicate that the linked list of waiting threads is being accessed to awaken a thread or to optimize the linked list of waiting threads.

19. The computer-readable storage medium of claim 16, further comprising incrementing an awaken count to indicate that one or more threads are to be awakened, all threads in the linked list of waiting threads being awakened when the awaken count reaches a maximum allowed value.

20. The computer-readable storage medium of claim 16, wherein the head of the linked list of the linked list of waiting threads is an oldest waiting thread of the linked list of waiting threads.

* * * * *